(12) United States Patent
Seibold

(10) Patent No.: US 7,535,707 B2
(45) Date of Patent: May 19, 2009

(54) POWER SUPPLY COOLING SYSTEM

(75) Inventor: Lawrence B. Seibold, San Jose, CA (US)

(73) Assignee: Rackable Systems, Inc., Fremont, CA (US)

( * ) Notice: Subject to any disclaimer, the term of this patent is extended or adjusted under 35 U.S.C. 154(b) by 324 days.

(21) Appl. No.: 11/282,848

(22) Filed: Nov. 17, 2005

(65) Prior Publication Data

US 2007/0109741 A1  May 17, 2007

(51) Int. Cl.
*G06F 1/20* (2006.01)
*H05K 5/00* (2006.01)
*H05K 7/20* (2006.01)

(52) U.S. Cl. ........................ 361/687; 361/695
(58) Field of Classification Search ................ 361/687, 361/695; 454/184
See application file for complete search history.

(56) References Cited

U.S. PATENT DOCUMENTS

| | | | |
|---|---|---|---|
| 5,107,398 A * | 4/1992 | Bailey | 361/687 |
| 5,596,483 A * | 1/1997 | Wyler | 361/687 |
| 5,691,883 A | 11/1997 | Nelson | |
| 5,999,365 A * | 12/1999 | Hasegawa et al. | 361/687 |
| 6,058,009 A * | 5/2000 | Hood et al. | 361/687 |
| 6,081,425 A * | 6/2000 | Cheng | 361/687 |
| 6,115,250 A * | 9/2000 | Schmitt | 361/695 |
| 6,134,107 A * | 10/2000 | Kerrigan et al. | 361/687 |
| 6,141,213 A | 10/2000 | Antonuccio et al. | |
| 6,304,443 B1 | 10/2001 | Chou | |
| 6,313,988 B1 * | 11/2001 | Pham | 361/687 |
| 6,356,435 B1 | 3/2002 | Davis et al. | |
| 6,437,980 B1 | 8/2002 | Casebolt | |
| 6,504,718 B2 * | 1/2003 | Wu | 361/695 |
| 6,650,535 B1 * | 11/2003 | Moss et al. | 361/687 |

(Continued)

OTHER PUBLICATIONS

International Search Report, PCT/US06/44319, Aug. 29, 2007.*

(Continued)

*Primary Examiner*—Jayprakash N Gandhi
*Assistant Examiner*—Adrian S Wilson
(74) *Attorney, Agent, or Firm*—Cooley Godward Kronish LLP

(57) ABSTRACT

A power supply for use in a negative pressure computer system is provided, including: an enclosure; an air exhaust port provided on a first side of the enclosure; an air intake port provided on a second side of the enclosure, said second side being adjacent to the first side having the exhaust port; and an air mover configured to draw cooling air into the intake port and exhaust cooling air out of the exhaust port. A computer system is provided, including: a chassis; a printed circuit board (PCB) mounted in the chassis; one or more computer components coupled to the printed circuit board; a power supply for supplying power to the one or more computer components. The power supply includes: a power supply enclosure; a power supply intake port for receiving cooling air into the power supply housing; a power supply exhaust port oriented to exhaust air from the power supply housing into an interior region of the chassis; and a power supply air mover configured to draw cooling air into the power supply intake port and exhaust cooling air out of the exhaust port and into the interior region of the chassis. The computer system further includes one or more chassis air movers to draw the cooling air emitted from the exhaust port of the power supply out of the interior region of the chassis.

7 Claims, 4 Drawing Sheets

U.S. PATENT DOCUMENTS

| | | |
|---|---|---|
| 6,795,314 B1 * | 9/2004 | Arbogast et al. ............ 361/695 |
| 6,829,141 B2 | 12/2004 | Garnett et al. |
| 6,847,524 B2 | 1/2005 | Tomioka et al. |
| 6,876,164 B2 | 4/2005 | Liu |
| 7,068,509 B2 * | 6/2006 | Bash et al. ................. 361/687 |
| 7,108,051 B2 * | 9/2006 | Hung ......................... 361/695 |
| 2004/0085727 A1 * | 5/2004 | Kim ........................... 361/687 |
| 2005/0030711 A1 | 2/2005 | Tsai |
| 2005/0168938 A1 | 8/2005 | Bash et al. |
| 2005/0170770 A1 | 8/2005 | Johnson et al. |
| 2005/0218869 A1 | 10/2005 | Casebolt et al. |

OTHER PUBLICATIONS

Writen Opinion of the International Searching Authority, PCT/US06/44319.*

International Search Report, PCT/US06/44319, mailing date Aug. 29, 2007.

Written Opinion of the International Searching Authority, PCT/US06/44319.

* cited by examiner

POWER SUPPLY COOLING SYSTEM

BACKGROUND

In many high density computer system installations, the computer systems are mounted in racks, which are in turn arranged in repeating rows or cells. As the densities of these computer systems have increased, the need for improved cooling systems for dissipating heat generated by the computer systems has increased as well.

FIG. 1 is a perspective view of an existing rack-mounted computer system 100. The computer system 100 comprises a chassis 102 containing a motherboard 104 and the various components of the computer which are coupled to the motherboard 104, such as one or more CPUs (central processing unit), memory, one or more hard disk drivers, and a power supply 110. The top cover of the chassis 102 is removed in FIG. 1 for clarity. In this example, the front side of the computer system 100 includes a variety of I/O (input/output) ports 112 and air intake ports 116 to allow cooling air to enter the chassis 102. The back side of the computer system 100 includes a plurality of fans 114 for drawing air out of the chassis 102.

The back side of the power supply 110 is positioned adjacent the back side of the chassis 102, and an opening is provided in the back side of the chassis 102 to expose the power plug receptacle and power switch of the power supply 110. The front side of the power supply 110 includes an air intake port 120 to allow cooling air to enter the power supply 110. The back side of the power supply 110 includes an air exhaust port (not shown) and a fan for drawing air into the air intake port 120 and out of the exhaust port. The back side of the chassis 102 also includes an opening to expose the exhaust port and the fan so that the cooling air drawn through the power supply 110 is exhausted out of the back side of the computer system 100.

In a standard installation, the computer system 100 is mounted with similar computer systems and other electronic equipment in a rack assembly. A standard rack that is widely used measures roughly 19 inches wide, 30 inches deep and 74 inches high. These racks may be arranged in rows of, for example, roughly 10-30 units, with access doors on each side of the racks. Access aisles are provided on both sides of the rows so that an operator may approach the access doors on each side.

In conventional rack-based computer systems, a plurality of computers are supported in a single stack in a rack. The front door of the rack assembly provides access to the front sides of the computers and the back door provides access to the back sides. Each computer system may also include one or more fans that draw ambient air into air intake ports provided on one side of the computer system, through the computer chassis, and out of exhaust ports provided on the opposite side of the computer system. The ambient air passing through the computer systems is used to cool the various components contained within the computer chassis.

In this type of installation, the computer systems are arranged such that the back sides of each row of computer systems face the back sides of an adjacent row of computer systems, and the front sides of each row of computer systems face the front sides of an adjacent row of computer systems. As a result, the rows of racks form "hot aisles" and "cold aisles". This arrangement enables cool air to flow from an HVAC system through the cold aisles to the front air intake of the computer systems. The heated air emitted by the computer systems flows away from the back exhaust to the air conditioner return ducts. This layout reduces the transfer of hot exhaust air from one system into the intake air of another system.

In another type of arrangement, two stacks of computer systems are positioned in a single rack in a back-to-back arrangement. An exhaust air plenum is provided between the two stacks of computer systems for allowing the exhaust air to be directed upward and away from the rack. An example of this arrangement is described in U.S. Pat. No. 6,496,366, entitled, "HIGH DENSITY COMPUTER EQUIPMENT STORAGE SYSTEM," the disclosure of which is incorporated by reference herein in its entirety.

In either arrangement, by drawing the heated air out of the computer system 100 and into the aisle or plenum, the exhaust fans 114 may produce a negative pressure within the chassis and a positive pressure immediately outside of the back side of the computer system. Accordingly, in order for the fan in the power supply 110 to effectively draw air through and out of the power supply 110, the fan must be strong enough to overcome the differential pressure between the inside and the outside of the computer system. This may be accomplished by using a higher power fan, but that can consume an excessive amount of the power supplied by the power supply 110. If the pressure differential of the computer system and the exterior region is sufficiently high, the power supply fan may be prevented from blowing heated air out of the back of the chassis or the heated air that had been emitted out of the computer chassis may even flow back into the power supply through the power supply fan opening, thereby causing the power supply to overheat and fail.

Accordingly, there is a need for an improved method of cooling a power supply for a computer system.

SUMMARY

In accordance with embodiments of the present invention, a power supply for use in a negative pressure computer system is provided, comprising: an enclosure; an air exhaust port provided on a first side of the enclosure; an air intake port provided on a second side of the enclosure, said second side being adjacent to the first side having the exhaust port; and an air mover configured to draw cooling air into the intake port and exhaust cooling air out of the exhaust port.

In accordance with embodiments of the present invention, a computer system is provided, comprising: a chassis; a printed circuit board (PCB) mounted in the chassis; one or more computer components coupled to the printed circuit board; a power supply for supplying power to the one or more computer components, comprising: a power supply enclosure; a power supply intake port for receiving cooling air into the power supply housing; a power supply exhaust port oriented to exhaust air from the power supply housing into an interior region of the chassis; and a power supply air mover configured to draw cooling air into the power supply intake port and exhaust cooling air out of the exhaust port and into the interior region of the chassis; and one or more chassis air movers to draw the cooling air emitted from the exhaust port of the power supply out of the interior region of the chassis.

In accordance with embodiments of the present invention, a method of operating a computer system is provided, comprising: drawing cooling air through a power supply intake port into an interior of a power supply enclosure; emitting the cooling air from the interior of the power supply enclosure out of a power supply exhaust port into a interior region of the computer system; and emitting the cooling air from the interior region of the computer system out of a chassis of the computer system.

Other features and aspects of the invention will become apparent from the following detailed description, taken in conjunction with the accompanying drawings which illustrate, by way of example, the features in accordance with embodiments of the invention. The summary is not intended to limit the scope of the invention, which is defined solely by the claims attached hereto.

DETAILED DESCRIPTION

In the following description, reference is made to the accompanying drawings which illustrate several embodiments of the present invention. It is understood that other embodiments may be utilized and mechanical, compositional, structural, electrical, and operational changes may be made without departing from the spirit and scope of the present disclosure. The following detailed description is not to be taken in a limiting sense, and the scope of the embodiments of the present invention is defined only by the claims of the issued patent. The terminology used herein is for the purpose of describing particular embodiments only and is not intended to be limiting of the invention. As used herein, the singular forms "a","an",and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
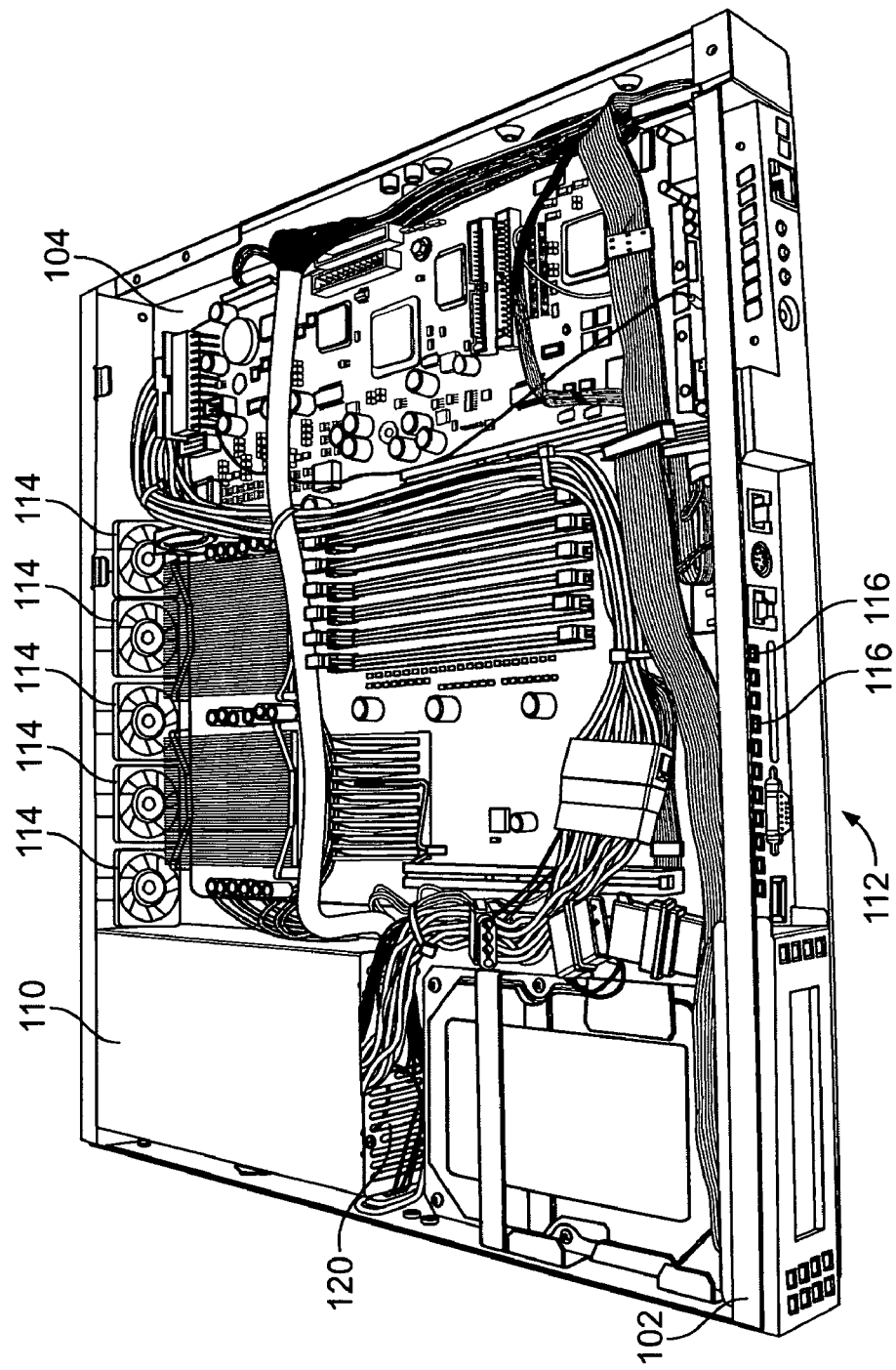
FIG. 1 is a perspective view of a rack-mounted computer system.
Figure 2A:
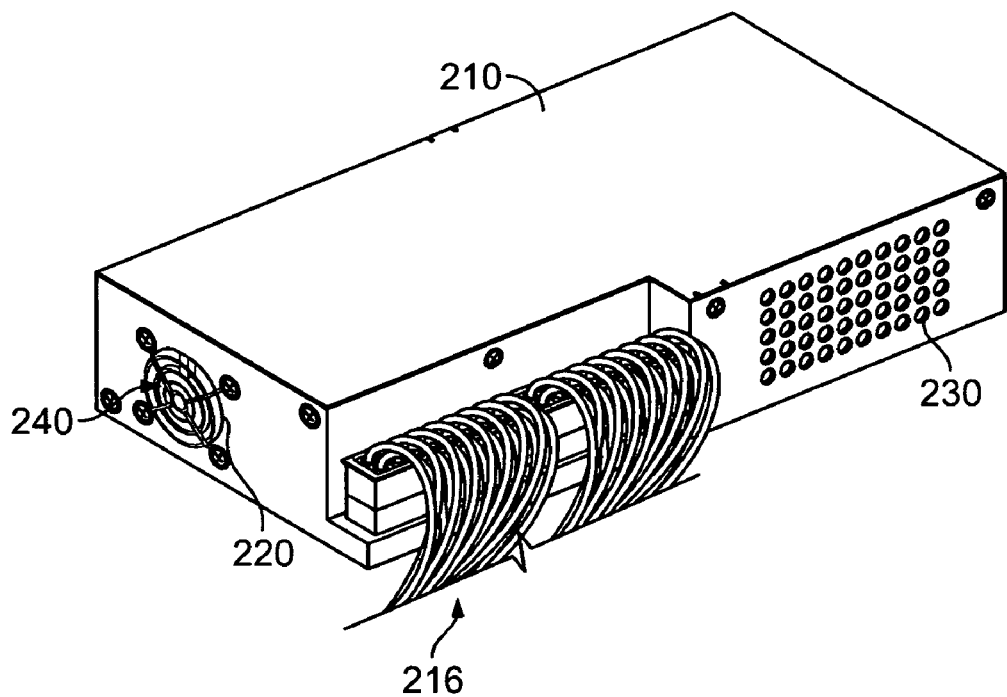
FIGS. 2A-2B are front and rear perspective views of a power supply, in accordance with embodiments of the present invention.
Figure 2B:
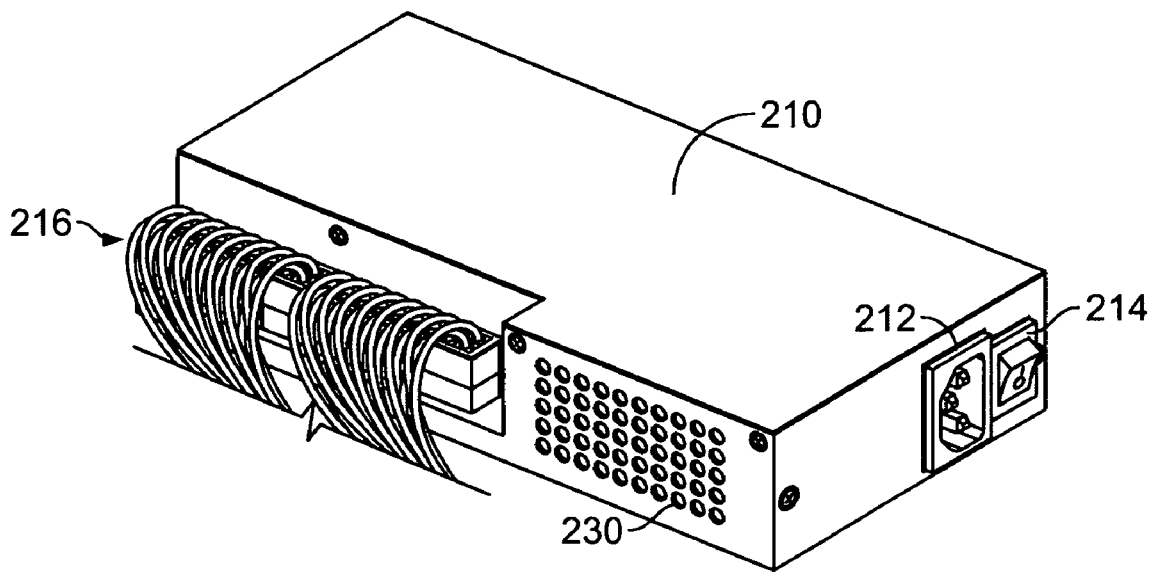

FIGS. 2A-2B are front and rear perspective views of a power supply 200, respectively, in accordance with embodiments of the present invention. The power supply 200 comprises an enclosure 210 having an air intake port 220 and an exhaust port 230. An air mover (e.g., a fan 240) is provided at the air intake port 220 to draw air through the power supply enclosure 210. An interface 216 may be provided for coupling the power supply 200 to the various components in the computer system. The interface 216 may include, e.g., power and control lines. In this embodiment, the interface 216 comprises a connector for connection with a set of power and control cables. A power receptacle 212 and a power switch 214 are provided on the back wall of the enclosure 210.

Figure 3A:
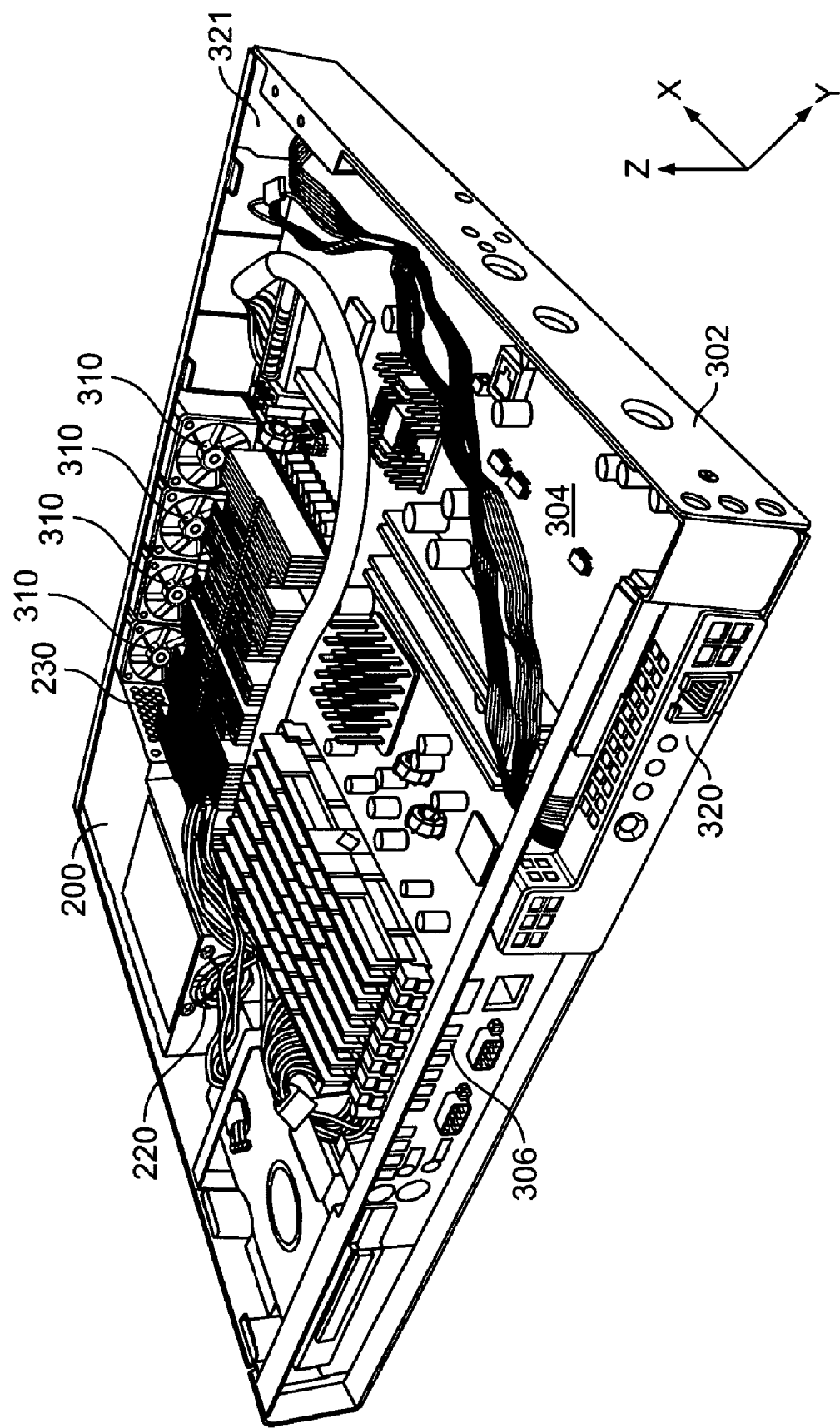
FIGS. 3A-3B are a front and rear perspective views, respectively, of a computer system including a power supply, in accordance with embodiments of the present invention.
Figure 3B:
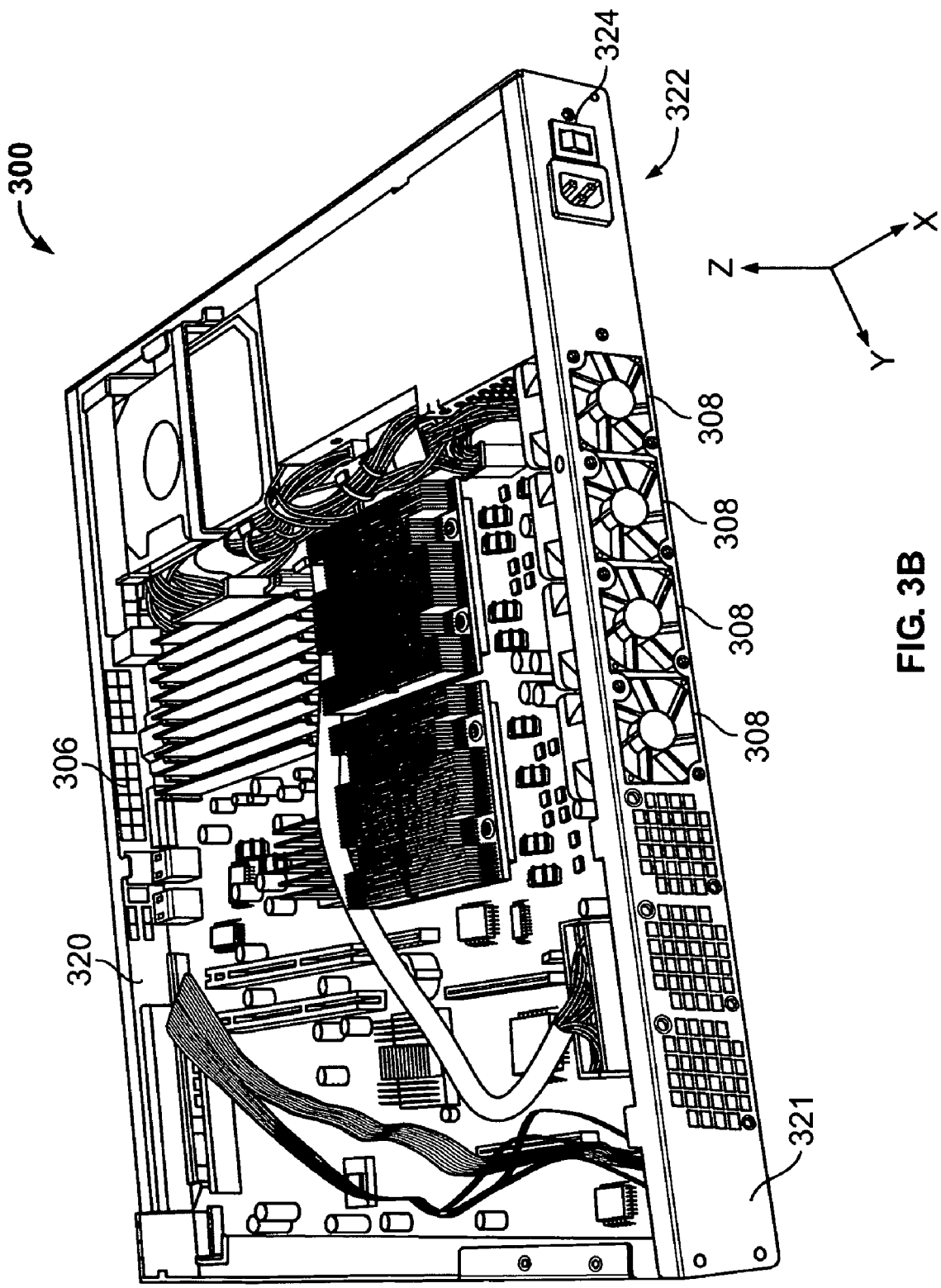

FIGS. 3A-3B are a front and rear perspective views, respectively, of a computer system 300 including a power supply 200, in accordance with embodiments of the present invention. In this embodiment, the computer system 300 comprises a rack-mountable server having a 1U profile, which is a common form factor for high-density server installations. The computer system 300 includes a chassis 302 containing a printed circuit board (PCB) motherboard 304 having various components coupled thereto. Typically, the chassis 302 will include six sides to fully enclose all of the components, with vents provided in multiple sides to allow cooling air to pass therethrough. In this embodiment, the chassis 302 includes one or more front air intake ports 306 on the front side 320 and rear intake ports 308 on the back side 321. The front side 320 of the computer system 300 is the side that is typically exposed and viewable by administrators when the computer system 300 is mounted in a rack assembly.

In early personal computers, the power supply fan was sufficient to cool the entire computer system. More recently, the cooling demands of computer systems require additional cooling capacity, such as auxiliary fans and CPU cooling devices. In the illustrated embodiment, a plurality of air movers (e.g., fans 310) are provided along the back side 321 of the computer system 300, with each fan 310 corresponding to one of the chassis exhaust ports 308. These fans can be, e.g., model no. FFB04-F00 125 W by the Delta Electronics, Inc. of Taiwan. These fans 310 draw air from the interior of the chassis 302 and blow the air out of the back side 321. This produces a negative air pressure within the chassis 302, thereby drawing air into the front air intake ports 306 and through the chassis 302 to cool the components contained within the chassis 302.

In contrast with conventional power supplies which exhaust air directly out of the back side of the computer system, the power supply 200 exhausts air into the interior of the chassis. In addition, the power supply 200 may both receive air from the interior of the chassis and exhaust air back into the interior of the chassis. In the illustrated embodiment, the cooling air is drawn into the chassis intake port 306 and into the power supply intake port 220 in a first direction X. The power supply fan 240 draws the air into the power supply 200, and causes the air to be exhausted out of the side of the power supply 200 in a direction Y. This exhausted air is then drawn out of the chassis 302 by the fans 310 adjacent to the chassis exhaust ports 308. As can be seen in FIG. 3B, the corner region 322 of the back side 321 includes an aperture to provide access to the power receptacle 212 of the power supply 200, but does not include an aperture to provide access to an exhaust port of the power supply.

With this arrangement, the power supply fan 240 causes the air to be exhausted from the power supply 200 into the interior of the computer chassis 302, rather than out of the back side 321 of the computer chassis 302. As a result, the power supply fan 240 does not have to overcome the differential air pressure between the inside and the outside of the computer system 300 in order to draw cooling air into the power supply 200. Thus, a lower power fan may be used for the power supply than would otherwise be necessary in order to provide the desired cooling.

In the illustrated embodiment, the power supply exhaust port 230 is positioned in close proximity to one of the chassis exhaust ports 308. Thus, the heated air emitted from the power supply 200 is immediately drawn out of the computer chassis 302 and does not unacceptably heat the interior of the chassis 302.

It is expected that in some embodiments, the pressure within the interior of the chassis 302 is $-\frac{1}{4}"$ $H_2O$ and the pressure immediately outside of the exhaust ports 308 is $+\frac{1}{4}"$. If a conventional power supply arrangement was utilized, a 15 kRPM fan would likely be used in order to overcome the pressure differential to adequately cool the power supply. This type of fan would consume approximately 8 W of power. If the power supply were a 90 W power supply, the consumption of 8 W could impose significant loads on the power supply.

By utilizing a power supply arrangement in accordance with embodiments of the present invention, a power supply having a power supply exhaust fan running at 4500 RPM, pushing a volume of 5 CFM, and consuming approximately 1

W would be sufficient to exhaust the air into the negative pressure interior of the chassis 302. High power exhaust fans 310 are already provided in the computer system 300 in order to cool the other components of the system (in particular, the processor(s) and hard drive(s)). These fans 310 are sufficiently powerful to overcome the positive pressure outside of the chassis 302 and to create the negative pressure within the chassis, thereby allowing fresh air to enter the chassis and cool the computer.

Embodiments of the present invention may be particularly useful in cooling computer systems provided in a back-to-back arrangement, as described in U.S. Pat. No. 6,496,366, entitled, "HIGH DENSITY COMPUTER EQUIPMENT STORAGE SYSTEM.", due to the high pressures generated in the plenum between the two stacks of computer systems. The computer systems in the two stacks may be positioned such that the chassis fans face the chassis fans in the adjacent stack. Thus, the chassis fans may be blowing air towards each other, causing increased pressures at the back sides of the computer systems.

In other embodiments, these power supplies may be desirable in other types of systems as well. In particular, in any type of arrangement in which the density of computer systems or support structures is sufficiently high that high pressures are generated near the exhaust ports for the computer system. This may be the case when the rack structure is partially enclosed or if adjacent racks are placed in close proximity with each other. In addition, the various computer systems stacked in a rack may experience different pressures, depending on their location within the rack. By utilizing a power supply which exhausts into the interior of the chassis, it is not necessary to adjust the power supply fan to accommodate this variation. If a higher powered fan is necessary to effectively cool a computer system in a particular location in the rack, this can be accomplished by modifying the chassis fans, rather than the power supply fan.

Embodiments may also be utilized for blade-type computer systems which do not include fully enclosed computer chassis. With blade-type computer systems, adjacent blades may be positioned very close proximity to each other. The exhaust fans for the computer systems may then generate negative pressures in the region defined by the plane of the motherboard, even though the chassis does not have enclosed walls.

Embodiments of the present invention may provide various advantages not provided by prior art systems. Improved cooling of the power supply may be provided by exhausting the cooling air into the interior of the chassis, rather than into the high pressure exterior region. In addition, as shown in FIGS. 3A-3B, the power supply may be positioned in a corner region of the chassis, so as to minimize the intrusion of the power supply into the interior of the chassis.

While the invention has been described in terms of particular embodiments and illustrative figures, those of ordinary skill in the art will recognize that the invention is not limited to the embodiments or figures described. For example, in many of the embodiments described above, the air intake ports are provided on the front side of the computer system and the exhaust fans are provided on the back side. In other embodiments, the exhaust fans may be provided on the front side and the air intake ports provided on the back side. Indeed, any side may be used for the intake and exhaust. Power supplies in accordance with embodiments of the present invention may be desirable in any system where the pressure outside of the chassis is greater than the pressure inside of the chassis adjacent the exhaust port for the power supply.

In addition, in the embodiment described above, the exhaust fans 310 are mounted just inside the back wall 321 of the chassis 302. In other embodiments, the exhaust fans for the computer systems which produce the negative pressure within the computer systems can be mounted onto various structures. For example, the exhaust fans may be mounted on the inside or outside of any of the sides of the chassis, or may be mounted to a structure coupled to the chassis or positioned adjacent to the chassis.

It is to be understood that the exhaust ports for the power supply and for the computer chassis may take various forms. In some embodiments, the exhaust port may comprise a single large opening to allow the passage of cooling airflow. This opening may be covered with a grill or other protective cover. In other embodiments, the exhaust port may comprise multiple openings of various sizes.

The power supply fan may in other embodiments be positioned elsewhere on the power supply. For example, the power supply fan may be positioned at the power supply exhaust port, rather than at the power supply intake port, as shown in FIG. 2A.

Therefore, it should be understood that the invention can be practiced with modification and alteration within the spirit and scope of the appended claims. The description is not intended to be exhaustive or to limit the invention to the precise form disclosed. It should be understood that the invention can be practiced with modification and alteration and that the invention be limited only by the claims and the equivalents thereof.

What is claimed is:

1. A computer system, comprising:
   a chassis;
   a printed circuit board (PCB) mounted in the chassis;
   one or more computer components coupled to the printed circuit board;
   a power supply for supplying power to the one or more computer components, comprising:
     a power supply housing comprising a front and an opposing back, and four sides perpendicular to the front and back of the power supply housing;
     a power supply intake port provided on the front of the power supply housing for receiving first cooling air into the power supply housing, wherein the first cooling air is used to cool the power supply;
     a power supply exhaust port provided on one of the four sides of the power supply housing, and oriented to exhaust the first cooling air from the power supply housing into an interior region of the chassis; and
     a power supply air mover configured to draw the first cooling air into the power supply intake port and exhaust the first cooling air out of the power supply exhaust port and into the interior region of the chassis;
   a chassis air intake port for receiving second cooling air into the interior region of the chassis, wherein the second cooling air remains outside the power supply housing; and
   a chassis air mover to draw a mixture of the first cooling air and the second cooling air out of the interior region of the chassis via a chassis exhaust port, wherein the chassis exhaust port is in close proximity to the power supply exhaust port, and wherein the chassis air mover is adjacent to the chassis exhaust port;
   wherein the chassis comprises a wall having the chassis exhaust port provided therein such that the mixture is emitted from the chassis exhaust port in a first direction;

wherein the power supply exhaust port is oriented to emit the first cooling air in a second direction substantially perpendicular to the first direction; and wherein the back of the power supply housing is adjacent to the wall of the chassis.

2. The computer system of claim 1, wherein:

the chassis air mover generates a differential air pressure between the interior region of the chassis and an exterior region of the chassis during operation; and the air pressure in the interior region of the chassis is less than the air pressure in the exterior region of the chassis.

3. The computer system of claim 1, wherein the chassis air mover generates a negative pressure in the interior region of the chassis during operation.

4. The computer system of claim 1, wherein during operation, an air pressure outside of the chassis is greater than the average air pressure immediately outside the power supply exhaust port.

5. The computer system of claim 1, wherein the power supply intake port is positioned to receive the first cooling air from an interior region of the chassis.

6. The computer system of claim 1, wherein the chassis air mover is a chassis exhaust fan.

7. The computer system of claim 1, wherein the one or more computer components comprise a processor coupled to the printed circuit board and a memory coupled to the printed circuit board.

\* \* \* \* \*